United States Patent

Shibano et al.

[11] Patent Number: 6,154,434
[45] Date of Patent: Nov. 28, 2000

[54] OPTICAL HEAD WITH BOTH A SERVO SIGNAL AND A RF SIGNAL DETECTING ELEMENTS FABRICATED ON A SINGLE SUBSTRATE

[75] Inventors: Motomichi Shibano; Shinya Hasegawa, both of Kawasaki, Japan

[73] Assignee: Fujitsu Limited, Kawasaki, Japan

[21] Appl. No.: 09/088,714

[22] Filed: Jun. 2, 1998

[30] Foreign Application Priority Data

Oct. 24, 1997 [JP] Japan ................................ 9-292673

[51] Int. Cl.$^7$ ................................................ G11B 11/10
[52] U.S. Cl. ................ 369/112; 369/44.23; 369/103; 369/110
[58] Field of Search ................. 369/44.23, 112, 369/13, 110, 44.12, 44.14, 120, 44.38, 44.37, 44.41, 44.42, 122, 106, 100, 103; 359/256, 495

[56] References Cited

U.S. PATENT DOCUMENTS

| | | | |
|---|---|---|---|
| 4,900,910 | 2/1990 | Doi | 250/201.5 |
| 5,381,279 | 1/1995 | Shingaki et al. | 359/256 |
| 5,488,598 | 1/1996 | Endo et al. | 369/120 |
| 5,502,708 | 3/1996 | Morimoto | 369/110 |
| 5,673,241 | 9/1997 | Koyama et al. | 369/44.23 |
| 5,708,644 | 1/1998 | Hasegawa | 369/112 |
| 5,790,504 | 8/1998 | Hayashi et al. | 369/112 |
| 5,881,043 | 3/1999 | Hasegawa et al. | 369/106 |
| 5,978,344 | 11/1999 | Horinouchi et al. | 369/112 |

FOREIGN PATENT DOCUMENTS

6-295481  10/1994  Japan.

*Primary Examiner*—Tan Dinh
*Assistant Examiner*—Kim-Kwok Chu
*Attorney, Agent, or Firm*—Armstrong, Westerman, Hattori, McLeland & Naughton

[57] ABSTRACT

An optical pickup for writing/reading a magneto-optical signal recorded in a magneto-optical recording medium is provided, which reduces the size, integrates the functions and improves the mounting efficiency of a magneto-optical signal detection mechanism. The optical pickup comprises a semiconductor laser, a hologram for transmitting and diffracting the light emitted from the semiconductor laser, a collimator lens for condensing the light emitted from the semiconductor laser, an objective lens for condensing the laser light on an optical recording medium, a composite device interposed between the collimator lens and the objective lens, and photo-detectors for detecting an optical signal. The composite device 10 includes a polarization beam splitter 11, a condensation device 12, a reflector and a polarizer/splitter 14 integrated with each other. A photo-detector for detecting a servo signal and a photo-detector for detecting a magneto-optical signal are fabricated on a single substrate.

12 Claims, 12 Drawing Sheets

BEAM SPLITTING BY SIMULATION

BEAM SPLITTING BY SIMULATION

Fig.13

OPTICAL HEAD WITH BOTH A SERVO SIGNAL AND A RF SIGNAL DETECTING ELEMENTS FABRICATED ON A SINGLE SUBSTRATE

BACKGROUND OF THE INVENTION

1. Field of the Invention

The present invention relates to an optical pickup for writing and reading magneto-optical signals recorded in a magneto-optical recording medium or, more particularly to an optical pickup comprising an optical substrate of a material such as glass, optical crystal or transparent plastic and at least an optical device formed on a surface of the optical substrate.

2. Description of the Related Art

Conventional equipment using a semiconductor laser finds wide applications with computer peripherals, optical communication equipment, etc. One of such examples is a magneto-optical disk device.

A semiconductor laser is used as a laser light source for writing and/or reading signals into and/or from a disk medium. Optical devices including a detector for condensing, splitting and detecting the laser beam and a semiconductor laser are collectively called an optical pickup.

In recent years, an apparatus has been under development, in which a magneto-optical disk device is mounted in a personal computer (PC) for handling a large capacity recording medium. Mounting such an apparatus in a notebook-sized PC requires a magneto-optical disk device which is further reduced in size and power.

A lighter weight and a smaller size of optical parts are also required for effective utilization of the internal space of the magneto-optical disk device.

Figure 1:
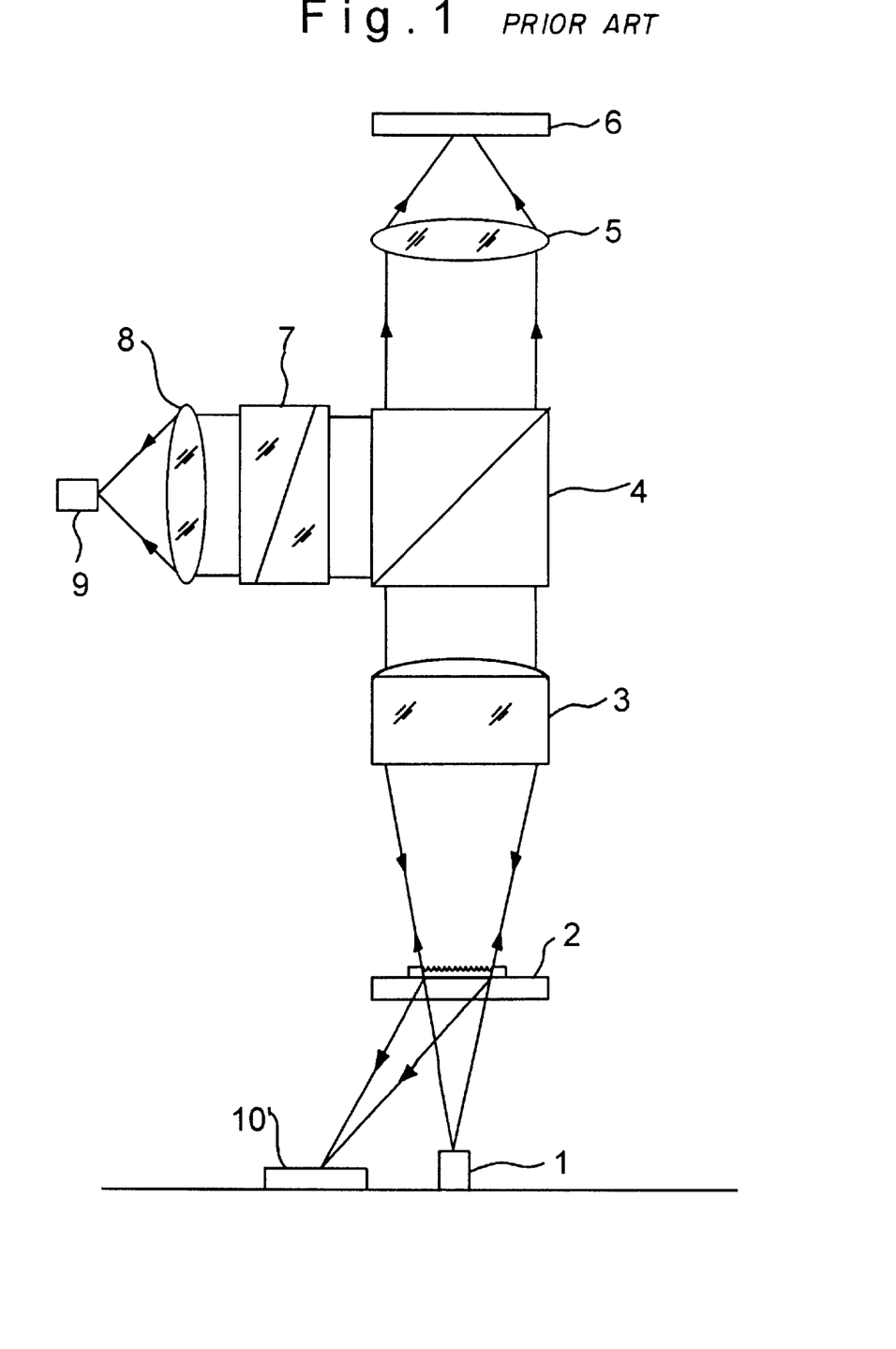
FIG. 1 shows a part of the optical system of a conventional optical pickup.

An application using a hologram is shown in FIG. 1 as an example of an optical system used in a magneto-optical disk device. This optical system is so configured that the light is separated by a hologram for detecting a tracking signal and a condensing signal, thereby realizing integrated functions. In FIG. 1, a laser beam emitted from a semiconductor laser or light emitting diode (LD) 1 spreads at a predetermined angle while being transmitted through a hologram 2 and corrected into parallel light rays by a collimator lens 3. Further, the laser beam is transmitted through a beam splitter 4 and condensed by an objective lens 5 on the surface of a medium, such as a magneto-optical disk 6. Signal light reflected from the surface of the medium 6 is transmitted through the objective lens 5 and partly reflected by the beam splitter 4, and through a Wollaston prism 7 and a condenser lens 8, and is detected as a magneto-optical signal by a magneto-optical signal photo-detector shown to the left of FIG. 1. On the other hand, a component of the light that has passed through the beam splitter 4 reaches the hologram 2 through the collimator lens 3. A part of the laser beam is diffracted and condensed on a quarter photo-detector (PD) or a photo-detector 10', thereby detecting a tracking error signal and a focus error signal.

JP-A-6-295481 discloses an optical pickup comprising a semiconductor substrate including a semiconductor laser and photo-detector means having a plurality of light detectors, a collimator lens, an objective lens, light path splitting means interposed between the collimator lens and the objective lens for polarizing and splitting the return light path from the magneto-optical recording medium into first and second light paths, a first hologram arranged as a unit integrated with the semiconductor substrate for diffracting the return light from the first light path, a second hologram for diffracting the return light from the second light path, and a light splitter having a polarize/split surface, wherein the positive and negative lights linearly-diffracted by the first hologram and the light split by the polarize/split surface are detected by the photo-detector means.

In the optical system shown in FIG. 1 or the optical pickup disclosed in JP-A-6-295481, the effective utilization of the mounting space and the reduction in the number of parts is a critical problem. Specifically, an increased weight or an increased mounting space of the optical parts used for the optical pickup bring about a bulky head base for supporting them. The result is a higher cost of an apparatus having a disadvantageous performance and an uncompetitive price. Especially, the magneto-optical signal detection means including the Wollaston prism 7, the condenser lens 8 and the photo-detector 9 shown in FIG. 1 uses expensive optical parts with an isolated magneto-optical signal detector and thus has a disadvantageous configuration for packaging.

SUMMARY OF THE INVENTION

Accordingly, the object of the present invention is to provide a low-cost optical pickup which is high in mounting efficiency and comprises a compact magneto-optical light detection mechanism having integrated functions.

DESCRIPTION OF THE PREFERRED EMBODIMENTS

Figure 2:
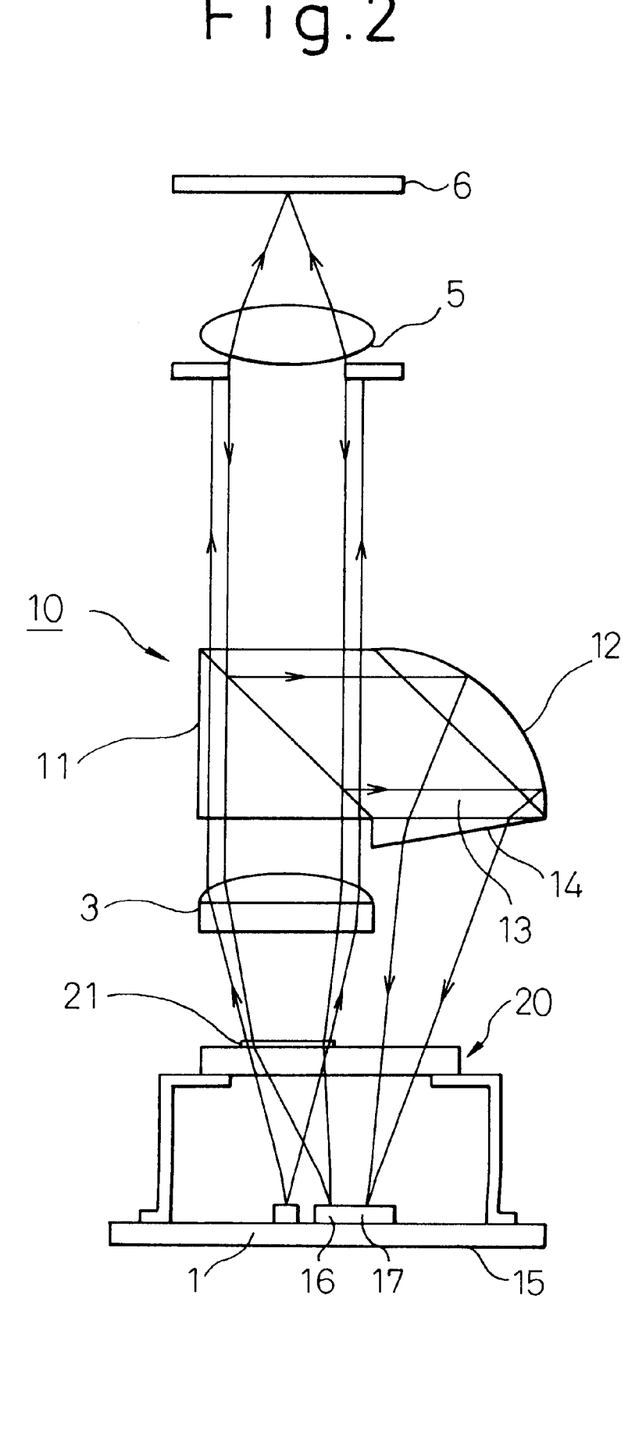
FIG. 2 is a sectional view of an optical pickup according to the invention, in which a polarization beam splitter (PBS), a condenser lens, a reflector and a polarizer/splitter are integrated with each other.

In order to achieve the above-mentioned object, according to the present invention, there is provided an optical pickup having a fundamental configuration described below. The invention is schematically shown in FIG. 2. An optical pickup according to the invention comprises a semiconductor laser or light emitting diode (LD) 1 making up a light source, a collimator lens 3 functioning to correct the spreading laser beam emitted from the light source into parallel beams, and an objective lens 5 for condensing the parallel beams on a magneto-optical recording medium 6. Further, in order to extract a magneto-optical signal from the light reflected on the magneto-optical recording medium 6, a polarization beam splitter (PBS) composite device 10 is arranged between the objective lens 5 and the collimator lens 3. For detecting a servo signal light, such as a tracking error signal and a focus error signal, an optical substrate 20 including a hologram 21 is interposed between the collimator lens 3 and the light source 1.

Figure 3:
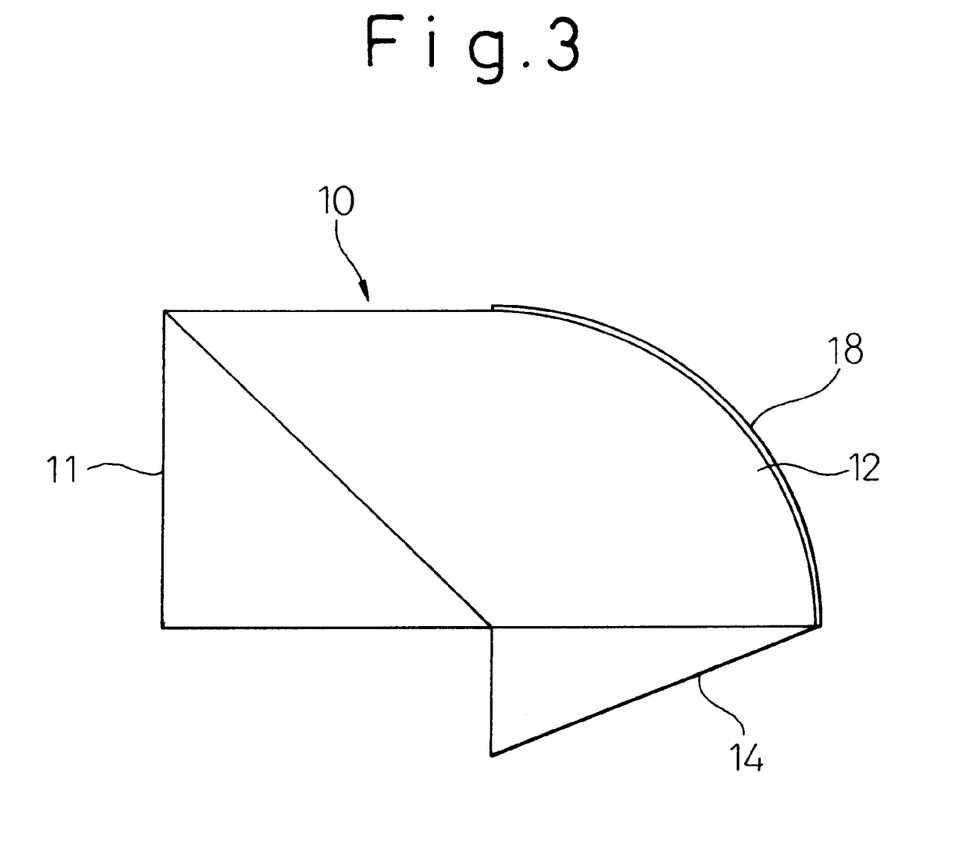
FIG. 3 is a sectional view of an optical pickup according to the invention, in which the PBS and the condenser lens in FIG. 2 are integrated with each other by molding.

The PBS composite device 10 has an integrated structure of a normal polarization beam splitter (PBS) 11, a condensation device 12, a reflection prism 13 and a polarizer/splitter 14. Specifically, a part of the cubic PBS 11 is expanded into a trapezoidal prism 13 having an end surface thereof formed with a condensation device (condenser lens 12) covered with a phasechangeless reflection film 18 (FIG. 3). Further, the portion of the integrated structure protruded toward the light source 1 is bonded with a polarizer/splitter 14.

On the same surface of a stem 15 on which the light source 1 is arranged, there are also arranged a photo-detector 16 for detecting the servo signal light such as a tracking error signal or a focus error signal, and a photo-detector 17 for detecting the magneto-optical signal from the polarizer/splitter 14.

The optical pickup having the above-mentioned structure according to the invention operates in the following-described manner. The return light containing the magneto-optical signal reflected from the magneto-optical recording medium 6 is reflected on the PBS 11, converged by the condensation device 12 having the phasechangeless reflection film 18 (FIG. 3), and then split into two polarized light components by the polarizer/splitter 14. The two light beams thus split are converged while being transmitted through a glass substrate 20 having a hologram 21 (but not through the hologram 21 itself), and condensed on the photo-detector 17 arranged on the same surface as the light source 1. The magneto-optical signal is converted into an electrical signal by the photo-detector 17, and each signal is detected differentially to thereby read the recorded information. The return light passed through the PBS 11 is converged through the collimator lens 3 and diffracted by the hologram 21. The linear light component of the diffracted light is further split into four portions by a hologram pattern (not shown), and the signal light is condensed on the photo-detector 16 in order to detect a focus error signal and a servo error signal.

The polarizer/splitter 14 is configured of a birefringent uniaxial optical crystal prism instead of the Wollaston prism 7 used in the prior art shown in FIG. 1. As a result, the number of parts can be reduced, and a cost-effective system is realized. Also, the crystallographic axis of the uniaxial optical crystal is arranged at 45 degrees to the direction of polarization of the light from the LD 1 constituting a light source to make up a polarize/split prism (polarizer/splitter 14). In this way, a configuration is obtained which is advantageously capable of detecting a magneto-optical signal.

The condensation device 12 is made of a lens elliptical in shape (an anamorphic lens). Thus the shape of the beam on the photo-detector 17 is improved, thereby producing a configuration advantageous for positive detection of a magneto-optical signal.

Another advantage is that the cost of fabricating the elliptical lens can be reduced while at the same time eliminating the steps of bonding and positioning by integrating it with the prism using glass molding.

The reflection film 18 (FIG. 3) is formed on the surface of the convex elliptical lens constituting the above-mentioned elliptical lens. As a result, a prism having the dual functions of a lens and a reflector is realized at a smaller size and a lower cost.

Further, the volume production of the condensation device 12 on a flat plate is possible by employing a gradient index condenser lens as the condenser lens. Furthermore, the steps of bonding and positioning the lens can be advantageously eliminated.

The elliptical pattern of the gradient index lens improves the beam shape and the beam splitting property on the photo-detector 17, thus realizing a configuration advantageous for positive detection of a magneto-optical signal.

The volume production of the condensation device on a flat surface is made possible for a lower fabrication cost by employing a holographic optical element (HOE) or a diffractive optical element (DOE).

With regard to the photo-detector, the servo signal photo-detector 16 and the magneto-optical signal photo-detector 17 are integrated with each other and formed on a single semiconductor substrate. In this way, the cost of the photo-detectors 16, 17 is reduced, thereby realizing an advantageous configuration in which the mounting jobs such as positioning and wire-bonding of individual photo-detectors can be avoided.

Further, in respect of the invention described in FIGS. 2 and 3, the incident light of the optical signal containing a magneto-optical signal split by the PBS composite device 10 is applied at such an incidence angle or adapted in such a manner as not to pass the hologram 21 in the light path leading to the magneto-optical signal photo-detector 17. In this way, the loss of the diffracted or transmitted light quantity which otherwise might occur in the hologram 21 is avoided, and an advantageous configuration can be realized without adversely affecting the bit rate of the signals.

Figure 9:
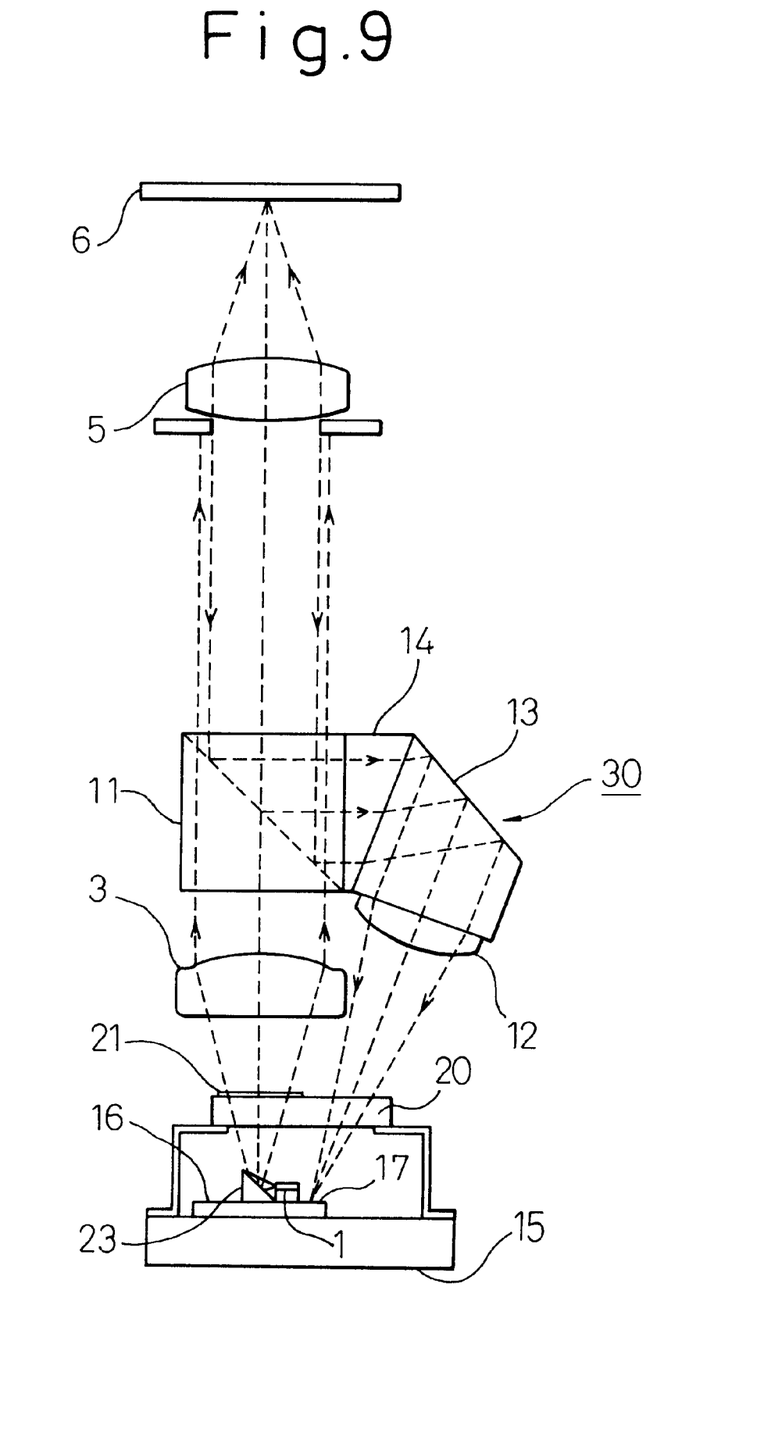
FIG. 9 is a sectional view of an optical pickup according to the invention, in which a PBS, a polarizer/splitter, a phasechangeless reflection prism and a condensation device are integrated with each other.
Figure 10:
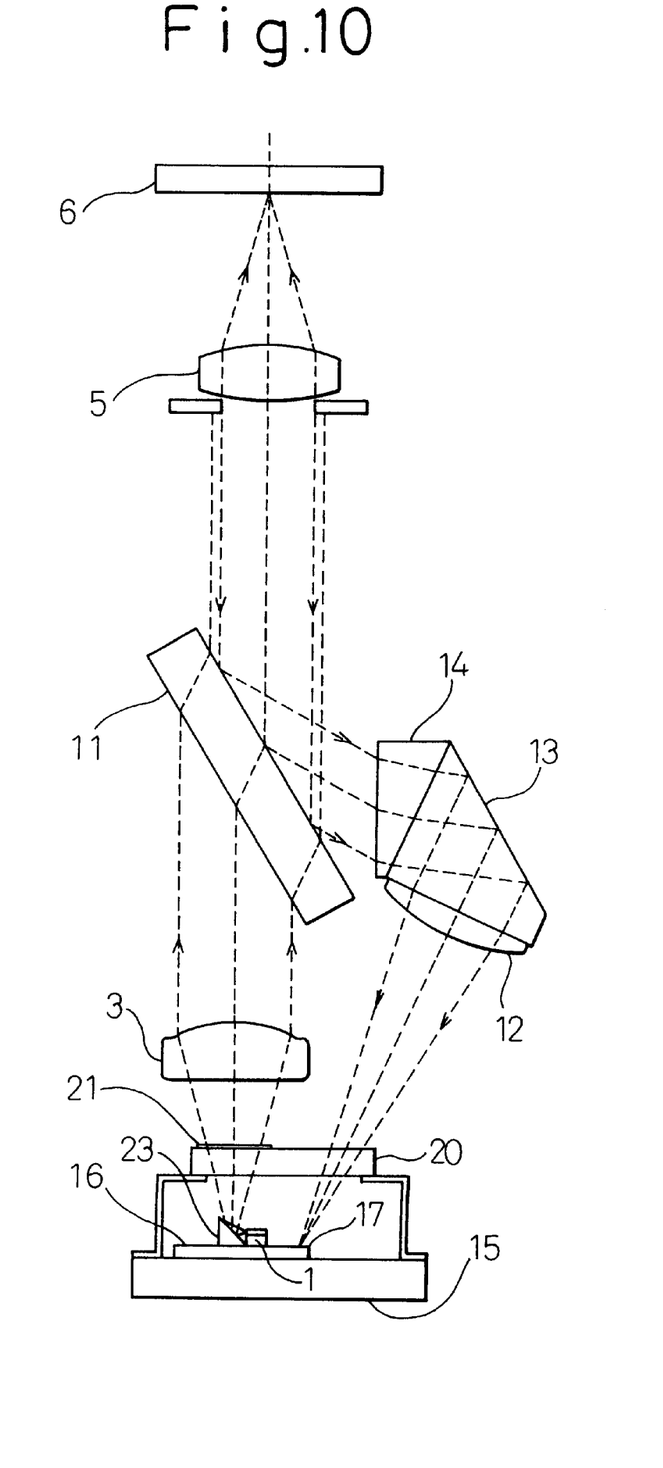
FIG. 10 is a sectional view of an optical pickup according to the invention, in which the PBS shown in FIG. 9 is tabular in shape.

Now, an optical pickup according to the invention shown in FIGS. 9 and 10 will be briefly described. Basically, the optical pickup comprises a semiconductor laser or light emitting diode (LD) 1 making up a light source, a collimator lens 3 having the function of correcting a spreading laser beam into parallel light rays and an objective lens 5 for condensing the parallel light rays on the magneto-optical recording medium 6. Further, in order to extract the magneto-optical signal from the reflection light containing a signal from the optical recording medium 6, a PBS 11 and a composite prism device are interposed between the objective lens 5 and the collimator lens 3. For detecting a tracking error signal and a focus error signal, on the other hand, an optical substrate 20 including a hologram 12 is interposed between the collimator lens 3 and the light source 1.

The composite prism device 30 has an integrated structure including the PBS 11, the reflection prism 13, the polarizer/splitter 14 and the condensation device 12 (FIG. 9) or an integrated structure including the polarizer/splitter 14, the reflection prism 13 and the condensation device 14 arranged independently of the PBS 11 (FIG. 10).

The photo-detector 16 for detecting the tracking error signal and the focus error signal is arranged on the same surface of a stem as the photo-detector 17 for detecting a magneto-optical signal. Further, the LD 1 and the reflection prism 23 are mounted integrally on the surface of the assembly.

The optical pickup having the above-mentioned structure according to the invention has the following operation characteristics and features.

The laser beam radiated from the light source 1 mounted on the photo-detectors (PD) 16, 17 is transmitted through the reflection prism 23, the hologram 21, the collimator lens 3, the PBS 11 and the objective lens 5 and reaches the magneto-optical recording medium 6. The return light containing the magneto-optical signal reflected from the magneto-optical recording medium 6 is reflected on the PBS 11 thereby to split the above-mentioned signal light into two polarized components by the polarizer/splitter 14. The two light rays thus split reach the condensation device 14 through the phasechangeless reflection prism 13. Further, the light rays, while being converged, are transmitted through the glass substrate 20 having the hologram 21 (but not through the hologram 21 itself) and are condensed on the photo-detector 17 arranged in the same plane as the light source 1. The magneto-optical signal from the photo-detector 17 is converted into an electrical signal, and individual signals are differentially detected, thereby reading the recorded information. The return light transmitted through the PBS 11, after being transmitted through the collimator 3, is converged and diffracted by the hologram 21. The first-order component of the diffracted light is further divided into four portions by a hologram pattern (not shown), and the signal light is condensed on the photo-detector 16 in order to detect a focus error signal and a servo error signal.

In the optical system shown in FIG. 9, the PBS 11, the polarizer/splitter 14, the phasechangeless reflection prism 13 and the condensation device 12 are configured integrally. In this way, the positioning operation is facilitated and a compact optical pickup can be provided.

In the optical system shown in FIG. 10, on the other hand, the PBS 11 is configured in tabular form thereby to provide an inexpensive optical pickup.

As in the optical pickup shown in FIG. 2, the polarizer/splitter 14 is configured not of a Wollaston prism used in the prior art shown in FIG. 1 but of a birefringent uniaxial optical crystal prism as in the optical system according to the invention shown in FIG. 2. As a result, the number of parts can be reduced and a cost-effective system is provided. Also, the optical axis of the uniaxial optical crystal is arranged at an angle of 45° to the direction of polarization of the light from the LD providing a light source to constitute a polarizer/split prism. Thus a configuration is obtained which is advantageous for detecting a magneto-optical signal.

Further, the polarizer/splitter 14, the phasechangeless reflection prism 13 and the condensation device 12 are arranged integrally in such a manner that the magneto-optical signal light is passed through these component parts in that order sequentially after passing through the PBS 11 along the light path leading to the photo-detector 17. In this way, the width by which the signal light is split is increased, thereby making it possible to detect the signal in a sufficient fashion.

In the case where the condenser device 12 and the phasechangeless reflection prism 13 are integrally formed by glass molding, the process of positioning and bonding the parts are saved and low-cost parts can be obtained.

With regard to the photo-detectors 16, 17, the servo signal photo-detector 16 and the magneto-optical signal photo-detector 17 are integrated with each other and formed on a single semiconductor substrate. By so doing, the cost of these photo-detectors can be reduced while at the same time eliminating the need of such mounting jobs as positioning and wire-bonding the individual photo-detectors, thus making possible an advantageous configuration.

Further, in the configuration of the invention described with reference to FIGS. 9 and 10, the optical signal containing a magneto-optical signal split by the composite prism device is applied at such an incident angle or in such a manner that the incident light is not passed through the hologram 21 in the light path leading to the magneto-optical signal photo-detector 17. Consequently, the loss of the diffracted and transmitted light amount in the hologram is saved, thereby realizing an advantageous configuration without adversely affecting the bit rate of the signal.

Now, in order to envisage the effects of the invention more specifically, embodiments thereof will be described.

First Embodiment

A first embodiment of the invention is shown in FIG. 2. This embodiment comprises a semiconductor laser 1, an optical substrate 20 including a hologram 21, a collimator lens 3, a PBS composite device 10, an objective lens 5, photo-detectors 16, 17 and a stem 15.

The semiconductor laser 1 having a central oscillation wavelength of 685 nm, which emits a laser beam having a maximum divergence angle of about 20 degrees, is mounted on the stem 15 at the substantial center of the hologram 21. The stem 15 is formed of copper in a press and has such a structure as to be capable of radiating the heat of the semiconductor laser 1 effectively.

The hologram 21 is divided into four portions for diffracting the tracking error signal light and the focus error signal light, and has each area thereof patterned with a gentle curve to condense the light on the photo-detector 16. The beam passes through the hologram with the zero-order diffraction efficiency of 70% and reaches the collimator lens 3 on the outgoing path. On the incoming path, on the other hand, the return light is diffracted with the first-order (linear) diffraction efficiency of 30% and the signal light is led to the photo-detector 16. This hologram 21 is fabricated by etching a glass substrate, by injection using a die, or a 2P method. According to this embodiment, the hologram was fabricated by the 2P method which can fabricate the hologram 21 most easily. As a result, the substrate 20 is made of a BK7 glass plate with the surface thereof formed with the hologram 21 of an photo polymer.

The collimator lens 3 and the objective lens 5, in view of the light weight thereof, are fabricated by an injection molding of plastic. However, such a material as glass can be used in place of a plastic with equal effect.

The front and back surfaces of the hologram 21, the collimator lens 3 and the object lens 5 are covered with an AR coat of laser wavelength for avoiding the loss of the laser light quantity due to surface reflection. Especially, the collimator lens 3 and the hologram substrate 20 are covered with a coating less dependent on the incidence angle taking the loss of an oblique incident light into consideration.

The polarization film of the PBS composite device 10 has such a characteristic that the transmittance of the light P-polarized the same way as the semiconductor laser beam is about 85% and the reflectivity of the light S-polarized the same way as the magneto-optical signal is at least 95%.

In the embodiment shown in FIG. 2, part of the glass material constituting the PBS 11 is formed of a trapezoidal prism having a lens 12 mounted on the end surface thereof as a condensation device. The condenser lens 12 is fabricated by a method such as a plastic molding or a glass molding using a glass material or a resin material like acryl resin or polyolefin resin making up the PBS 11 and having substantially the same refractive index as the glass material (BK7 in the embodiment).

The surface of the condenser lens 12 is coated with a phasechangeless reflection film 18 (FIG. 3). As a result, the return light can be reflected without changing the phase. Also, the integrated functions of lens and reflector can reduce the size of the PBS composite device 10.

Further, as in the PBS composite device 10 shown in FIG. 3, part of the PBS 11 and the condenser lens 12 can be formed integrally by molding, and covered with the reflection film 18 of an AR coating or a phasechangeless reflection coating thereby to fabricate the device. In forming part of the PBS 11 and the condenser lens 12 integrally, the device is surface-ground to some degree to improve the surface accuracy of the flat portion.

Figure 4:
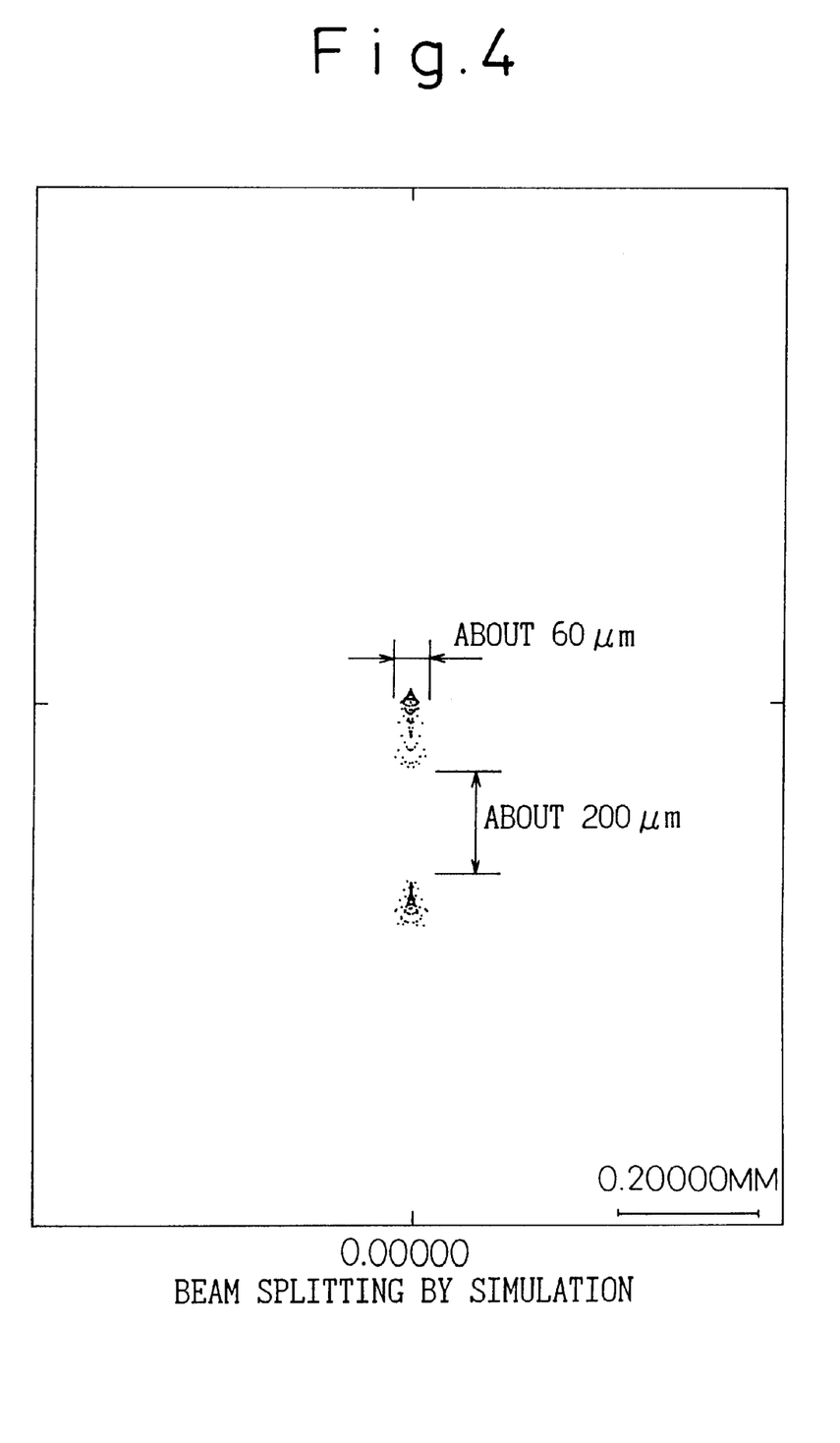
FIG. 4 shows an example of an optical pickup according to the invention, in which the beam shape of the signal light converged on a magneto-optical signal photo-detector is verified by simulation.

The lens is elliptical (anamorphic) in shape, and according to the present embodiment, has a radius of curvature of 67 mm along the long axis and 24 mm along the short axis. This permits the magneto-optical signal light to be condensed while being reflected on the photo-detector 17, thereby assuring an improved beam shape and beam splitting characteristic on the photo-detector 17. A beam-shape evaluation in the simulation shown in FIG. 4 substantiates that the light is condensed on the photo-detector with a beam split distance of about 200 μm and a beam size of about 60 μm.

Figure 5:
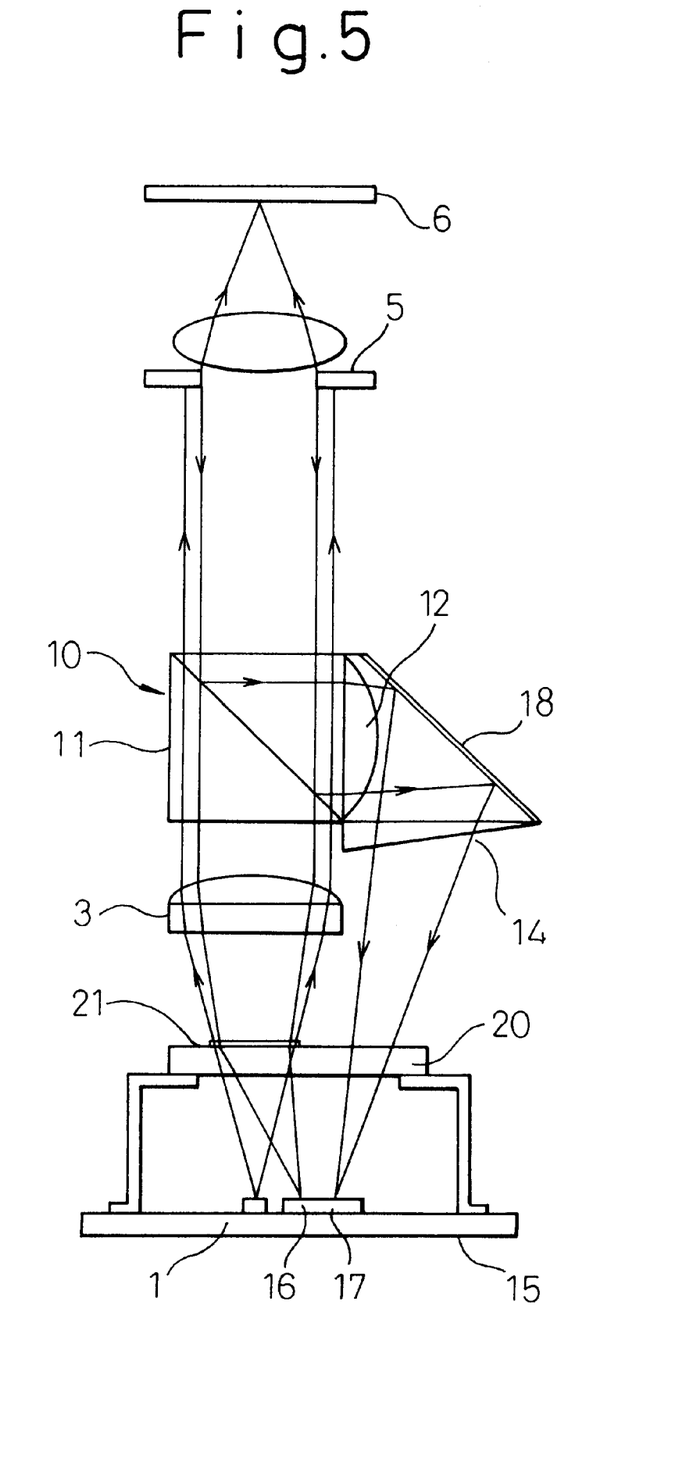
FIG. 5 shows an example of a PBS composite device using a gradient index lens as a condensation device.

Another embodiment in which the condensation device 12 is configured of a gradient index lens is shown in FIG. 5. In this embodiment, the gradient index lens can be fabricated in a manner similar to a semiconductor device. Therefore, a great number of the same lenses are fabricated at a time using a flat substrate. Also, since the condenser lens 12 can be incorporated within a glass substrate, the combination with the PBS 11, the integration between the condenser lens 12 and the reflector 18 and the integration with the polarizer/splitter 14 are made possible.

Further, an elliptical surface of the lens 12 can produce a condenser lens having the function equivalent to that of the elliptical lens 12 shown in FIG. 2. The condensation characteristic of this lens has been confirmed to have a performance equivalent to that represented by the beam shape and the beam split width shown in FIG. 4.

Figure 6:
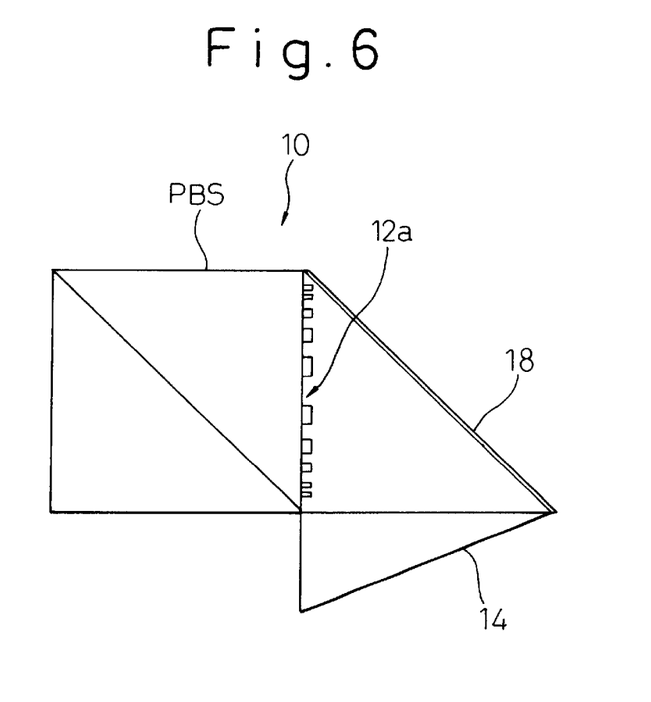
FIG. 6 shows an example of a PBS composite device using a hologram as a condensation device.

An example of the condenser device 12 fabricated of a hologram (a sort of HOE or DOE) 12a is shown in FIG. 6. The hologram 12a, if a volume hologram, can be fabricated in mass-production using a flat substrate by the same method as the gradient index lens. First, the surface of a glass substrate is patterned by resist, and the refractive index of the pattern thus formed is changed by ion exchange to produce a hologram. The spatial frequency of the pattern is varied from one part to another in order to produce the condensation function.

Figure 7:
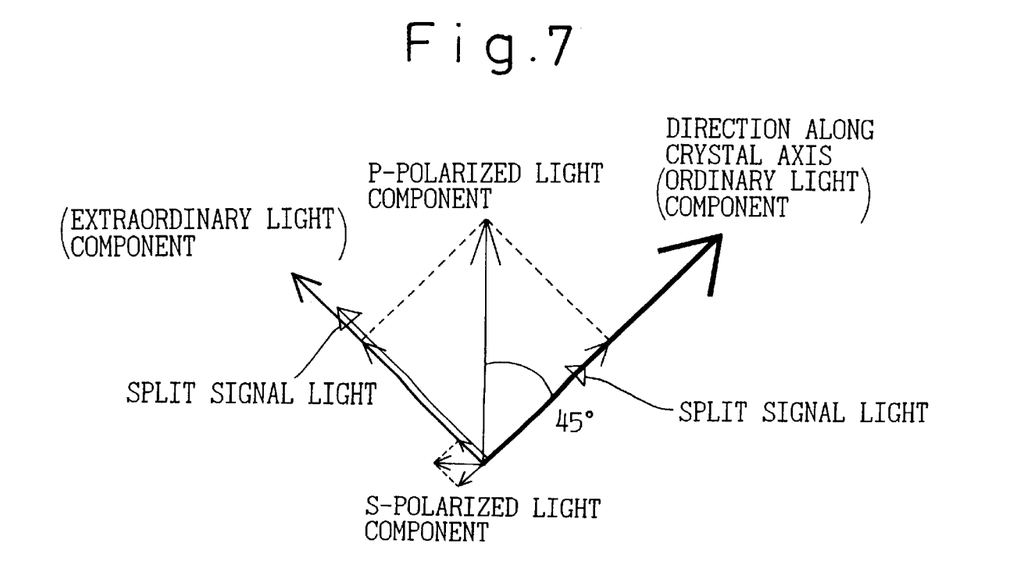
FIG. 7 shows the manner in which a magneto-optical signal light is split by a polarizer/splitter according to the invention.

A polarizer/splitter 14 is mounted on the LD-side portion of the trapezoidal prism of the PBS composite device 10. The polarizer/splitter 14 is a polarization hologram, a Wollaston prism, a micro PBS, etc. This embodiment uses a prism of a birefringent uniaxial crystal. A birefringent uniaxial crystal includes quartz, rutile, calcite, KDP, ADP, etc. Among them, lithium niobate which is readily available and has a comparatively large difference in refractive index between normal and abnormal light used in this embodiment. Also, a prism is formed by setting the optical axis of the crystal at 45° to the P-polarization axis (FIG. 7). The magneto-optical signal light is so weak that it is difficult to detect. By setting the optical axis at the above-mentioned angle, however, the signals to be detected can be equalized substantially, and a signal detection with a high S/N ratio is made possible by differential detection.

The operation of the above-mentioned first embodiment will be described. According to this embodiment, the return light from magneto-optical recording medium 6 is split into a signal light containing a magneto-optical signal S-polarized by the PBS 11 and a signal light P-polarized like the laser light source. In view of the fact that about 15% of the P-polarized light is reflected on the PBS 11, however, the S-polarized light and the P-polarized light coexist in the reflected light. The signal light thus is split by being passed through a birefringent uniaxial crystal prism constituting a polarizer/splitter. The birefringent uniaxial crystal prism is simple in structure and therefore can provide an inexpensive optical device.

The signal light thus split enters the collimator lens at a predetermined angle due to the refraction through the prism. This angle, i.e. the arrangement of the PBS composite device 10 and the collimator lens, is such as not to pass the signal light through the hologram. The signal light, therefore, can be condensed on the photo-detector 17 and converted into an electrical signal without being lost by diffraction in the hologram 21.

Figure 8:
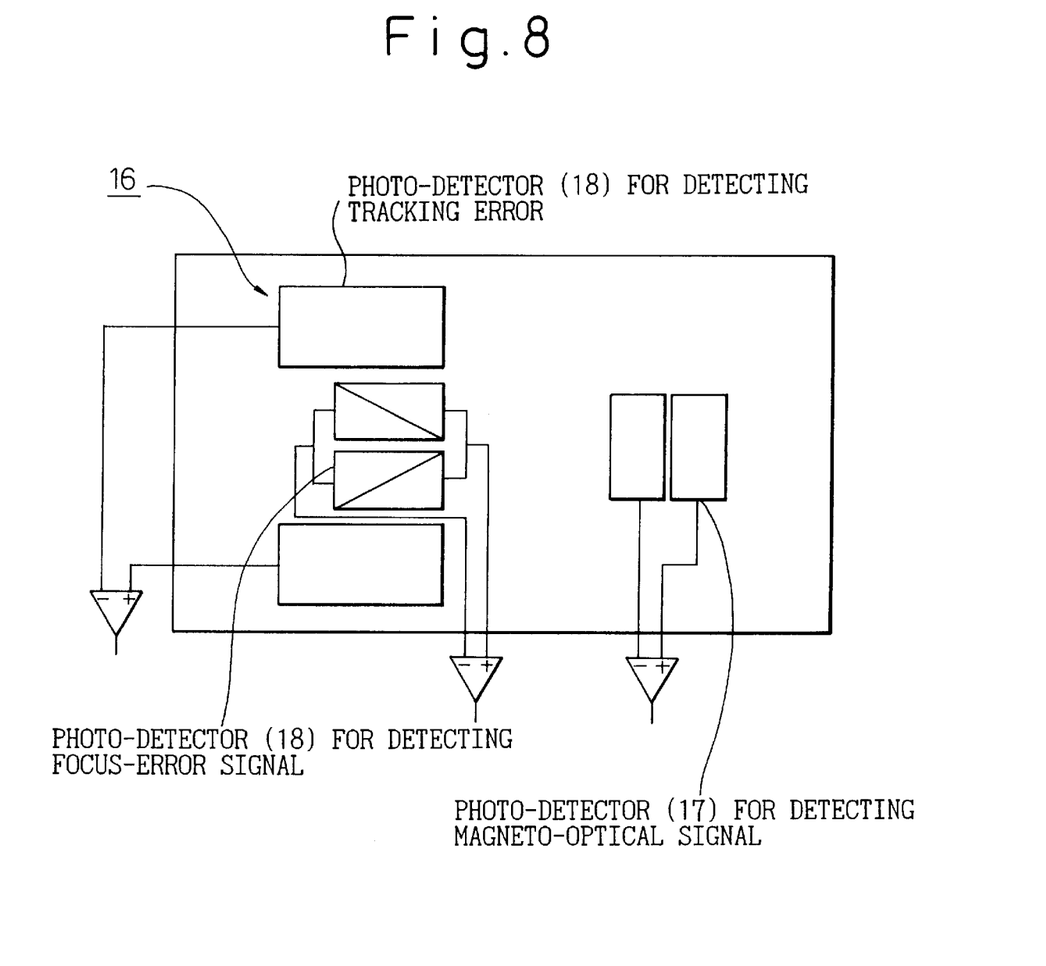
FIG. 8 shows an arrangement of photo-detectors according to the invention.

The photo-detectors 16, 17 are realized in such a compact and dense form that a PD for detecting a servo signal light and a PD for detecting a MO signal light is fabricated by patterning on a single semiconductor substrate (FIG. 8). As a result, the required wiring can be formed by patterning, and the connection with external terminals can be accomplished by a minimum of wire bonding. Also, the process for positioning and mounting the photo-detectors 16 (18), 17 can be saved, thereby improving the positioning accuracy and reducing the fabrication cost.

Second Embodiment

FIGS. 9 and 10 show a second embodiment of the invention. This embodiment comprises a semiconductor laser 1, an optical substrate 20 including a hologram 21, a collimator lens 3, a composite prism device 11, an objective lens 5, photo-detectors 16, 17 and a stem 15.

The semiconductor laser 1, which emits a laser beam having a central oscillation wavelength of 685 nm and a maximum divergence angle of about 20 degrees, is fixed on the surface of the photo-detectors 16, 17 through a heat sink of aluminum nitride. In order to lead the laser beam to the collimator lens 3, a reflection prism 23 is arranged at an angle of 45 degrees with respect to the plane of the photo-detectors. The stem 15 is formed of copper in a press and has a structure capable of effectively dissipating the heat from the semiconductor laser 1.

The reflection prism 23 can be fabricated by grinding a material such as glass or by etching a Si crystal. According to this embodiment, the reflection prism 23 is formed in a glass mold in a plane and cut out by a slicer or a dicing saw. The glass material of BK7 is used. The structure and the method of fabrication of the hologram 21 are similar to those in the first embodiment. A part of a holder (not shown) of the collimator lens 3 is faced to a greater extent than the remaining parts taking into consideration that the magneto-optical signal light is applied diagonally.

The characteristics of the polarization film of the PBS 11 are such that the transmittance of the P-polarized light like the semiconductor laser beam is about 85% and that the reflectivity of the light S-polarized light in the same way as the magneto-optical signal is at least 97%.

Figure 11:
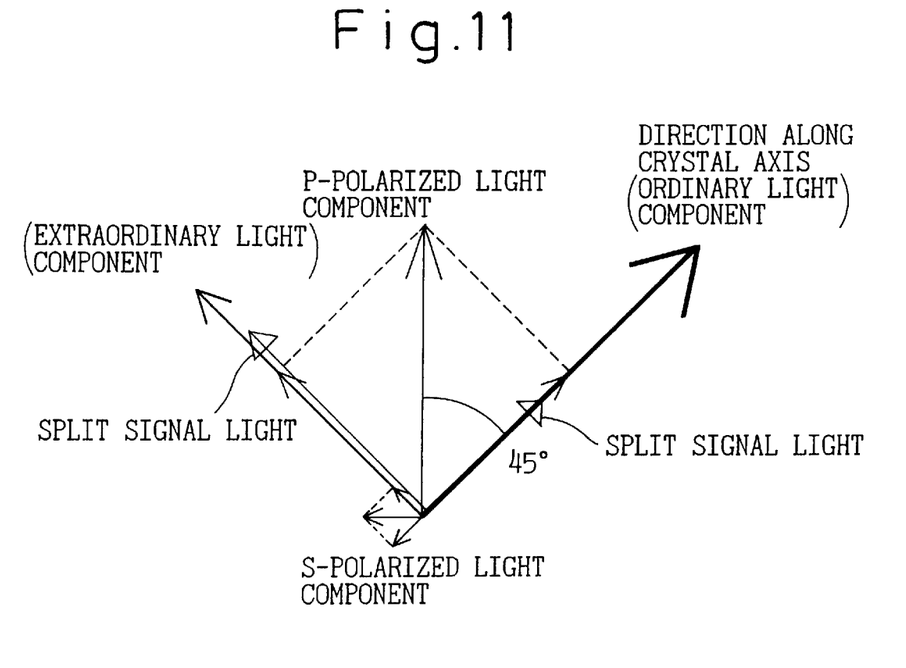
FIG. 11 shows the manner in which the magneto-optical signal light is split by a polarizer/splitter according to the invention.

According to the embodiment shown in FIG. 9, the PBS 11, the polarizer/splitter 14, the phasechangeless reflection prism 13 and the condensation device 12 are integrated with each other. A polarized-light hologram, a Wollaston prism, etc. can be used as the polarizer/splitter 14. The present embodiment, however, employs a prism of birefringent uniaxial crystal. A birefringent uniaxial crystal includes quartz, rutile, calcite, KDP, ADP, etc. Among them, the present embodiment uses readily-available lithium niobate which exhibits a comparatively large difference in refractive index between ordinary and extraordinary light components. Also, a prism is formed by setting the optical axis of the crystal at 45° to the P-polarization axis (FIG. 11). The magneto-optical signal light is so weak in intensity that it cannot be easily detected. By setting the optical axis at the above-mentioned angle, however, the signal can be detected with substantially the same value of intensity, and the signal detection with a high S/N ratio is made possible by differential detection.

The operation of the above-mentioned second embodiment will be described. According to this embodiment, the light returned from the magneto-optical recording medium 6 is split into a signal light containing the magneto-optical signal S-polarized by the PBS and a signal light P-polarized the same way as the laser light source. In view of the fact that about 15% of the P-polarized light is reflected on the PBS 11, however, the reflected light is a mixture of the S-polarized light and the P-polarized light. Therefore, the signal light is split by passing it through a birefringent uniaxial crystal prism making up a polarizer/splitter. The birefringent uniaxial crystal prism is simple in configuration and provides an inexpensive optical device.

Figure 12:
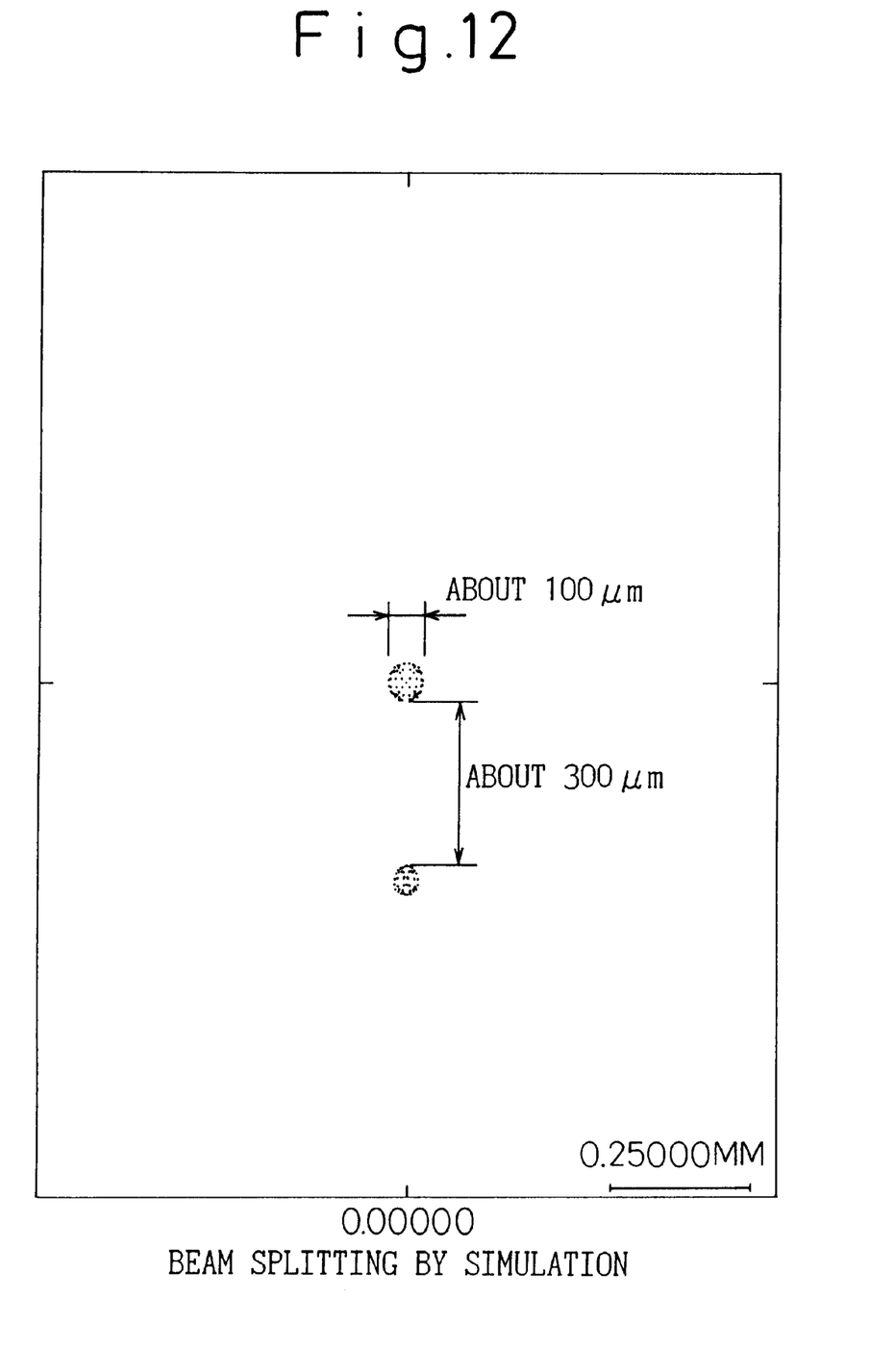
FIG. 12 shows an example of an optical pickup according to the invention in which the shape of the signal light beam converged on a magneto-optical signal photo-detector is verified by simulation.

Due to the entrance of the light from the PBS 11 in the direction perpendicular to the polarizer/splitter 14, the signal light can be split by being transmitted through the phasechangeless reflection prism 13 made of a uniform material. Further, since the reflection on the surface of and the internal transmission through the phasechangeless reflection prism can lengthen the light path, the signal light can be split with a larger width. The manner in which a beam is split is shown by simulation in FIG. 12. As compared with the beam diameter of about 100 μm, the split width is about 300 μm. Therefore, a characteristic with a sufficient margin is obtained for positional adjustment of the composite prism device.

The phasechangeless reflection prism 13 is fabricated by glass molding, and has an internal reflection surface formed with a phasechange reflection coating having not more than 8 degrees of phase difference.

Figure 13:
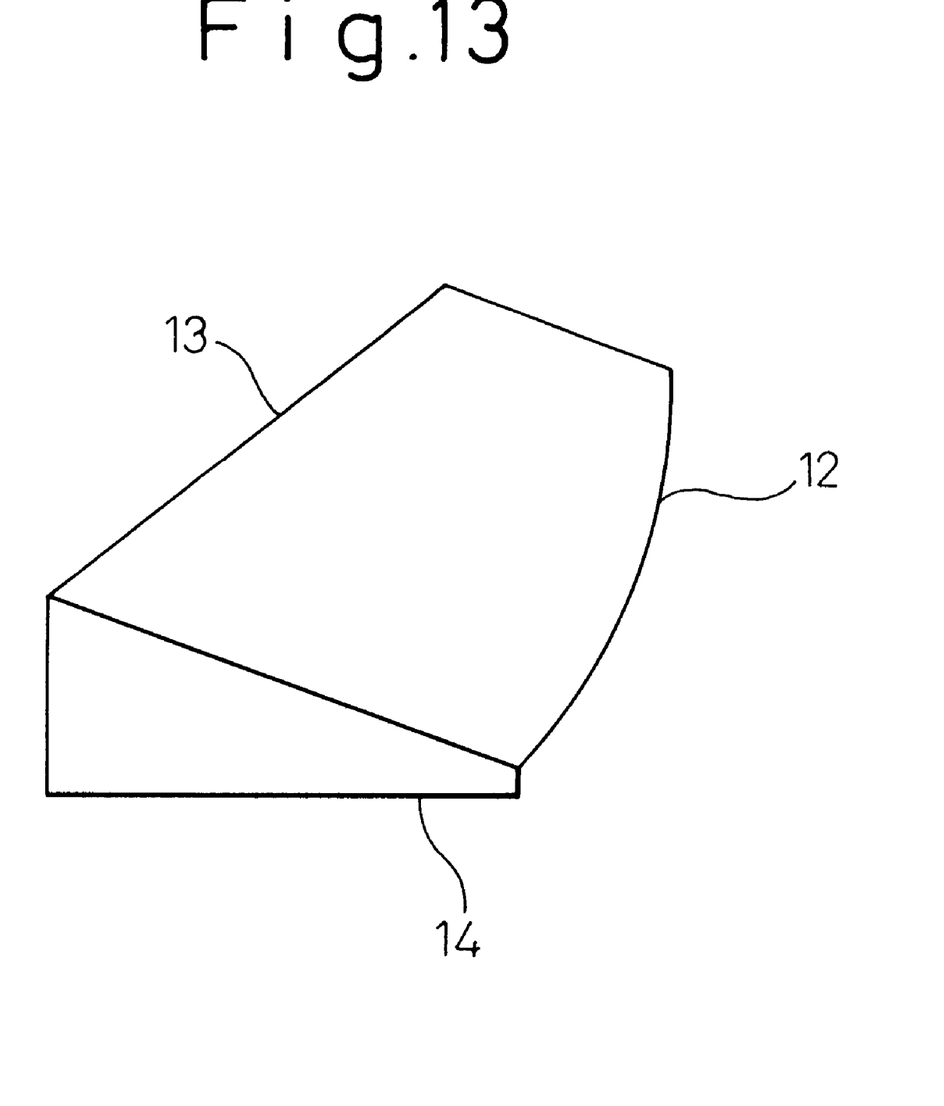
FIG. 13 shows an example of a composite prism device in which a phasechange reflection prism is integrated with a condensation device.

The condensation device 12 can be a gradient index lens, a Fresnel lens, etc. This embodiment, however, uses an ordinary spherical lens. Further, as shown in FIG. 13, a condensation device 12, a phasechangeless reflection surface 13 and a polarizer/splitter 14 are integrated by glass molding with the reflection prism, thereby realizing a mass production and a lower cost.

The signal light converged by the condenser lens 12 is applied diagonally to the hologram substrate 20. This angle and the relative arrangement of the composite prism device and the collimator lens 21 are determined in such a manner that the signal light is not passed through the hologram 21. The light therefore can be condensed on the photo-detector 17 and converted into an electrical signal without any loss due to the diffraction in the hologram 21.

The photo-detectors 16, 17, as in the aforementioned embodiment, include a photo-detector for detecting the servo signal light and a photo-detector for detecting the magneto-optical signal light, both of which are patterned on a single semiconductor substrate (FIG. 8).

In the embodiment shown in FIG. 10, the tabular form of the PBS 11 can reduce the cost of the parts. The tabular PBS 11 can be used in two ways. One is to reflect the outgoing light and transmit the incoming light, and the other is to transmit both the outgoing light and the incoming light. According to this embodiment, the outgoing light is transmitted to simplify the regulation.

As described above, according to the invention, the signal light containing the magneto-optical signal split by the PBS 11 is condensed by being split further into a magneto-optical signal light and a polarized light identical to the light source using a composite device including an integrated structure of the PBS 11, the condenser lens 12, the reflector 13 and the polarizer/splitter 14, thereby simplifying the optical system. Further, in order to correct the focal point and the focused shape of the convergent light, the condenser lens is elliptical, and the PBS composite device is arranged in such a position that the light is condensed in the same plane as the light source. Alternatively, the reflector and the condenser lens are integrally glass-molded in the composite prism device to condense the light in the same plane as the light source.

As a result, a photo-detector for detecting the magneto-optical signal light can be integrated with a photo-detector for detecting a tracking error and a focus error, thereby contributing to the simplification of the mounting work and the reduction in the size of the optical pickup. Further, the signal light separated is not adapted to pass through the hologram for splitting the servo signal light. The signal can be detected, therefore, with high accuracy without the loss of the magneto-optical signal light.

Also, the polarizer/splitter can be formed of a birefringent uniaxial crystal prism for further simplification of the optical system.

It will thus be understood from the foregoing description that according to the invention there is provided a high-density optical pickup low cost and in the number of parts used with integrated photo-detectors and without loss of magneto-optical signal light.

What is claimed is:

1. An optical pickup for writing and/or reading an optical signal recorded on an optical recording medium, comprising:
    a light source;
    a collimator lens for condensing the light emitted from said light source into parallel light rays;
    an objective lens for condensing said parallel light rays on an optical recording medium;
    a polarization beam splitter interposed between said collimator lens and said objective lens for reflecting part of a return light reflected from said optical recording medium as an optical signal light and transmitting the remaining part of said return light through said optical recording medium as a servo signal light;
    a first photo-detector for detecting the light reflected from said polarization beam splitter as an optical signal light;

means for condensing the light reflected from said polarization beam splitter on said first photo-detector;

a second photo-detector for detecting the light transmitted through said polarization beam splitter as a servo signal light;

means for condensing the light transmitted through said polarization beam splitter on said second photo-detector; and said first photo-detector for detecting an optical signal and said second photo-detector for detecting a servo signal being fabricated on a single substrate, wherein said polarization beam splitter is integrally coupled with a condensation device having the function of condensing the light containing the optical signal reflected from said polarization beam splitter, a reflector for reflecting said light toward said first photo-detector, and a polarizer/splitter for splitting said light into two polarized light components thereby to constitute a composite polarization beam splitter (PBS);

said polarization beam splitter, said condensation, said reflector, and said polarizer/splitter are arranged in such positions that said light containing the optical signal is passed first through said polarization beam splitter, then said condensation device, then said reflector and then said polarizer/splitter in that order.

2. An optical pickup according to claim 1, wherein said condensation device is selected one of a holographic optical element (HOE) and a diffractive optical element (DOE).

3. An optical pickup according to claim 1, wherein said polarizer/splitter is fabricated of a prism of a birefringent uniaxial crystal.

4. An optical pickup according to claim 2, wherein said birefringent uniaxial crystal has an optical axis forming an angle of 45° to the direction of polarization of that component of said optical signal light transmitted through said polarizer/splitter which is identical to the direction of polarization of the light emitted from a semiconductor laser constituting said light source.

5. An optical pickup according to claim 1, further comprising a hologram interposed between a semiconductor laser constituting said light source and said collimator lens, wherein part of the light emitted from said light source is transmitted through said hologram, part of the return light transmitted through said polarization beam splitter is condensed by said collimator lens, diffracted in said hologram, and converged on said second photo-detector for detecting said light as a servo signal indicating a tracking error, a focus error, etc.

6. An optical pickup according to claim 4, wherein each of said optical devices are arranged in such a manner that said optical signal light is not transmitted through said hologram in the light path reaching said first photo-detector for the optical signal light through said polarizer/splitter.

7. An optical pickup according to claim 1, wherein said condensation device is an elliptical lens.

8. An optical pickup according to claim 1, wherein said condenser device is a gradient index lens.

9. An optical pickup for writing and/or reading an optical signal recorded on an optical recording medium, comprising:

a light source;

a collimator lens for condensing the light emitted from said light source into parallel light rays;

an objective lens for condensing said parallel light rays on an optical recording medium;

a polarization beam splitter interposed between said collimator lens and said objective lens for reflecting part of a return light reflected from said optical recording medium as an optical signal light and transmitting the remaining part of said return light through said optical recording medium as a servo signal light;

a first photo-detector for detecting the light reflected from said polarization beam splitter as an optical signal light;

means for condensing the light reflected from said polarization beam splitter on said first photo-detector;

a second photo-detector for detecting the light transmitted through said polarization beam splitter as a servo signal light;

means for condensing the light transmitted through said polarization beam splitter on said second photo-detector; and said first photo-detector for detecting an optical signal and said second photo-detector for detecting a servo signal being fabricated on a signal substrate, wherein said polarization beam splitter is used in combination with a composite prism device including a condensation device having the function of condensing the light containing an optical signal reflected from said polarization beam splitter, a phasechangless reflection prism fo reflecting said light toward said first photo-detector, and a polarizer/splitter for splitting said light into two polarized light components.

10. An optical pickup according to claim 9, wherein said polarization beam splitter is tabular in shape.

11. An optical pickup according to claim 9, wherein said composite prism device has an integrated structure including said polarizer/splitter, said phasechangeless reflection prism and said condensation device, and wherein said polarizer/splitter, said phasechangeless reflection prism and said condensation device are arranged in such a manner that the light containing an optical signal is passed through said polarizer/splitter, said phasechange reflection prism and said condenser device, in that order, of said composite prism device.

12. An optical pickup according to claim 11, wherein said polarization beam splitter and said composite prism device are integrated with each other.

* * * * *